United States Patent [19]

Speiser

[11] 4,254,417

[45] Mar. 3, 1981

[54] BEAMFORMER FOR ARRAYS WITH ROTATIONAL SYMMETRY

[75] Inventor: Jeffrey M. Speiser, San Diego, Calif.

[73] Assignee: The United States of America as represented by the Secretary of the Navy, Washington, D.C.

[21] Appl. No.: 67,977

[22] Filed: Aug. 20, 1979

[51] Int. Cl.³ .......................... G01S 3/80; G01S 7/54; G06F 15/34

[52] U.S. Cl. .............................. 343/100 SA; 364/514; 364/728; 367/121; 343/854

[58] Field of Search ............... 364/514, 725, 726, 728, 364/821, 851; 367/119, 121, 123, 125, 126, 103, 138; 343/100 SA, 854

[56] References Cited

U.S. PATENT DOCUMENTS

| | | | |
|---|---|---|---|
| 3,723,955 | 3/1973 | Lyons et al. | 367/138 |
| 3,955,172 | 5/1976 | Rasi | 367/122 |
| 4,001,763 | 1/1977 | Kits Van Heyningen | 367/103 X |
| 4,003,016 | 1/1977 | Remley | 367/126 X |
| 4,014,023 | 3/1977 | Kirkland | 367/126 X |
| 4,060,792 | 11/1977 | Kits Van Heyningen | 367/126 X |
| 4,060,850 | 11/1977 | Speiser | 364/821 X |
| 4,107,685 | 8/1978 | Martin et al. | 367/122 X |
| 4,170,766 | 10/1979 | Pridham et al. | 367/126 X |
| 4,216,475 | 8/1980 | Johnson | 343/100 SA |

OTHER PUBLICATIONS

Gaubatz: FFT-Based Analog Beamforming Processor, 1976 Ultrasonics Symposium Proceedings, IEEE Cat. No. 76-CH1120-5SU Annapolis Md., Oct. 1976, pp. 676-681.

AGARWAL et al.: Fast One-Dimensional Digital Convolution by Multidimensional Techniques, IEEE Transactions on Acoustics, Speech, and Signal Processing vol. ASSP-22, No. 1, Feb. 1974, p. 1-10.

*Primary Examiner*—Felix D. Gruber

*Attorney, Agent, or Firm*—Richard S. Sciascia; Ervin F. Johnston; John Stan

[57] ABSTRACT

A frequency-domain beamformer is used with arrays comprising M rings with a maximum of N elements per ring, the positions of the elements having rotational symmetry. An element need not be present at each position. The outputs of each of the M rings of arrays are connected to the inputs of M sets of lowpass filters, each set comprising N filters. Each filter output is an input to a sample-and-hold circuit.

A temporal discrete Fourier transform (DFT) is performed on the output signal from each sample-and-hold circuit. M demultiplexers, one for each of the M sets of DFT circuits, convert their parallel input signals into serial output signals.

A memory, or function generator, is used for steering. A circular convolver convolves the outputs of the demultiplexers and the memories, the outputs of the convolvers being summed in an output summer.

The beamformer is used with a 3-D array such that it has rotational symmetry, that is, if rotated at some angle, the situation is exactly the same as before the rotation.

28 Claims, 3 Drawing Figures

FREQUENCY DOMAIN BEAMFORMER FOR ARRAYS WITH ROTATIONAL SYMMETRY.

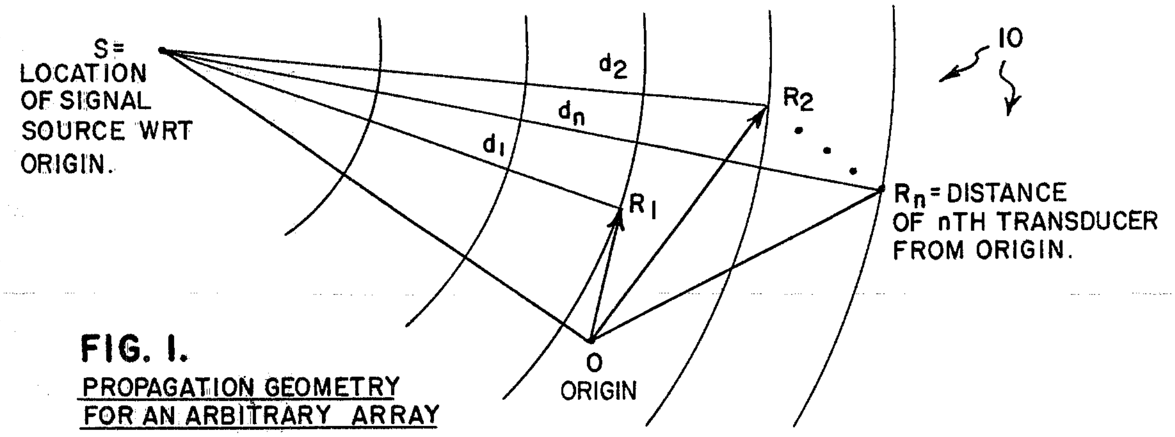
FIG. 1.
PROPAGATION GEOMETRY FOR AN ARBITRARY ARRAY
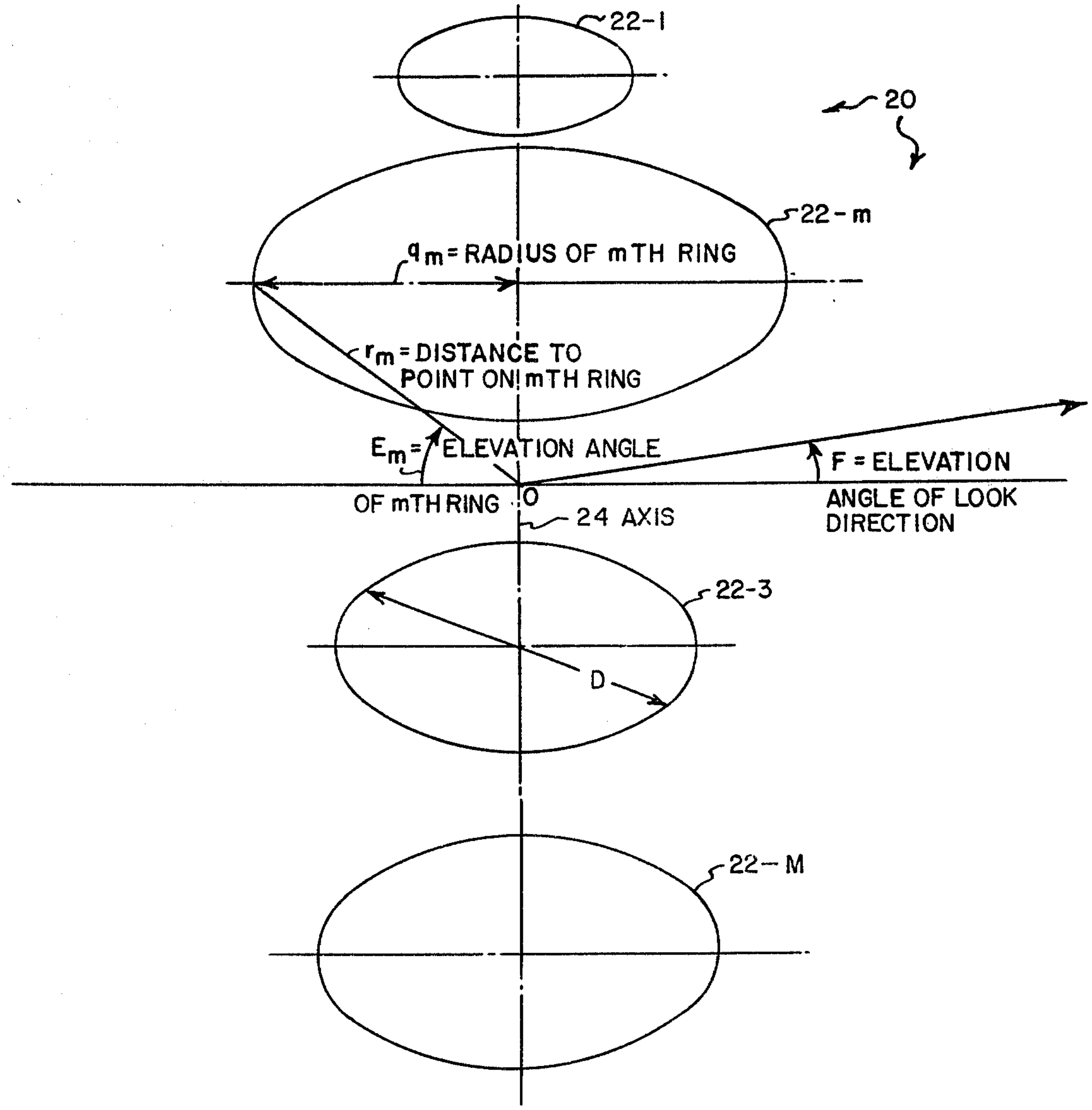
FIG. 2. GENERAL ARRAY WITH ROTATIONAL SYMMETRY.

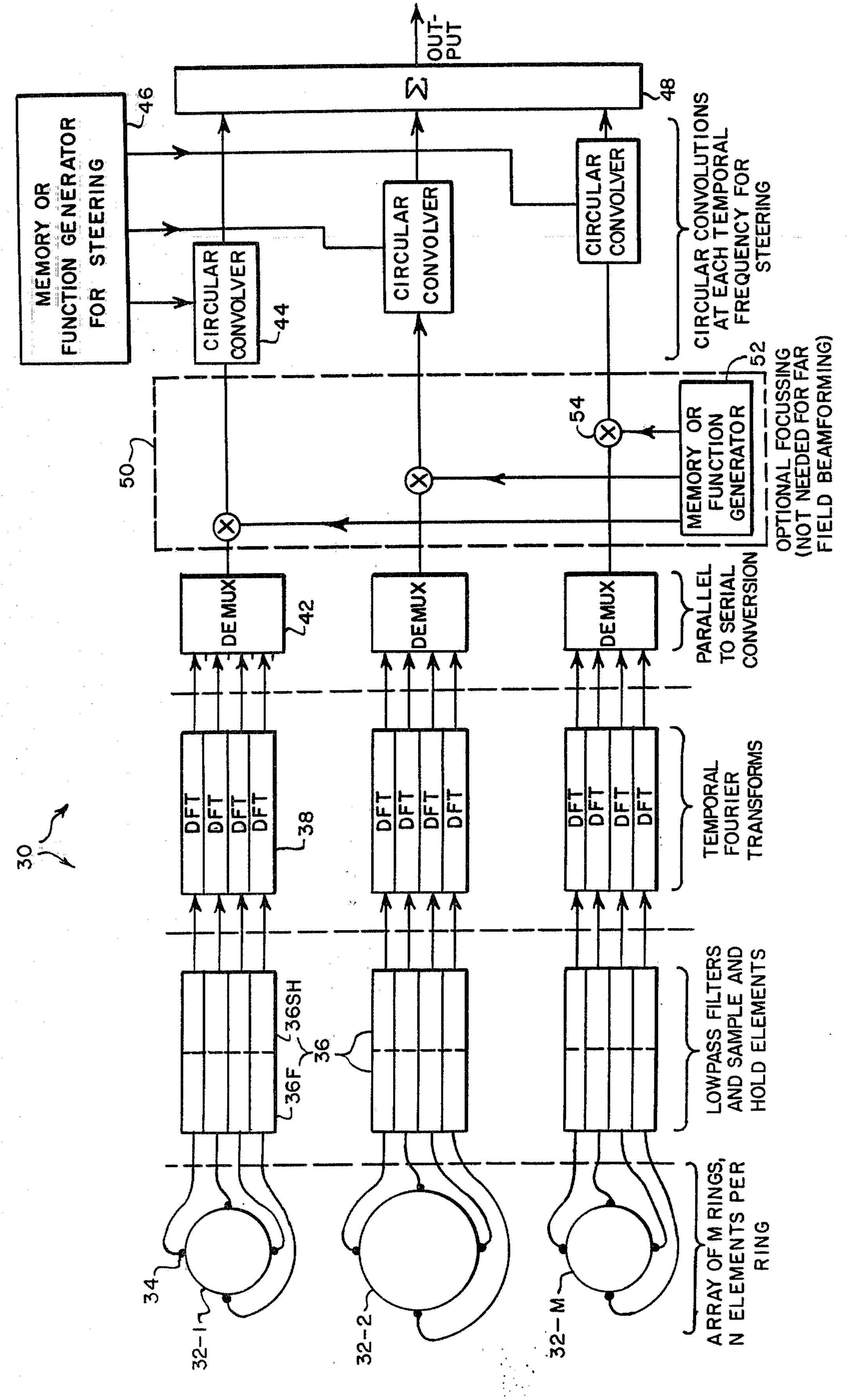
FIG. 3. FREQUENCY DOMAIN BEAMFORMER FOR ARRAYS WITH ROTATIONAL SYMMETRY.

BEAMFORMER FOR ARRAYS WITH ROTATIONAL SYMMETRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a high-speed beamformer for hydrophone or antenna arrays having symmetry under rotation, providing either a time-domain or a frequency-domain output.

Beamformers in the prior art usually fall into one of two categories: Time-domain beamformers using either delay lines or simulating delay lines in computer memory, or frequency-domain beamformers using the Fourier transform, where the Fourier transform is usually calculated using the fast Fourier transform (FFT) or the chirp-Z transform.

Time-domain beamformers using delay lines to form simultaneous multiple beams have the disadvantage that they require many output taps per delay line, since a summation across the delay lines is needed for each beam output. This makes such devices difficult and expensive to build because many interconnections are required. Time-domain beamformers using a computer memory to simulate delay lines require a vast number of memory accesses, and hence are quite limited in speed.

Prior art frequency-domain beam formers have the disadvantages that they either depend upon matrix multiplication, which is quite slow, especially if many beams are needed at many frequencies; or require a multi-dimensional Fourier transform to form beams for a line or planar array with uniform spacing. The latter beamformers are not only limited to the uniformly spaced rectangular grid, but also require interpolation if a time-domain output is desired.

Another class of beamformer which can handle arbitrary geometries has been proposed using triple product convolutions, but such devices are presently extremely limited in dynamic range because of the difficulty of performing a threefold multiplication in analog form.

Background information which would be useful for understanding this invention may be found in U.S. Pat. No. 4,060,850 entitled BEAM FORMER USING BESSEL SEQUENCES, which issued on Nov. 29, 1977, to Jeffrey M. Speiser. The invention therein described, however, is limited to arrays whose elements lie in a single circle. The present invention provides an extension to a three-dimensional array having circular symmetry, as well as explicitly providing for focusing and vertical depression or elevation of the steering directions if desired.

SUMMARY OF THE INVENTION

A frequency domain beamformer comprises a plurality of M arrays in the form of M rings, which may be of different diameters, disposed one above the other, all rings having their central axes along the same straight line. Each ring has a maximum of N signal receiving elements, $3<N<300$, symmetrically disposed about the ring whether all N elements in any specific ring are present or not. The position of each element or missing element is symmetrically disposed about the axis, corresponding elements in the various rings being in planes which include the central axis.

A plurality of M sets of means for filtering, an input of each means being connected to an output of an element, permits the filtering through of the low frequencies of the received signals.

A plurality of M sets of means for sampling-and holding has an input of each means connected to an output of a means for filtering.

A plurality of M sets of transform means, an input of each means being connected to an output of a sample-and-hold means, take a temporal discrete Fourier transform (DFT) of its input signal.

A plurality of M means for demultiplexing, each means having a set of inputs connected to the outputs of a set of DFT means, convert their parallel input signals into serial output signals.

A plurality M of convolving means, each having an input connected to the output of a means for demultiplexing, circularly convolve the demultiplexed signals.

Means, having an input to each of the means for circularly convolving, for steering the convolved signals.

Means, whose inputs are connected to the means for convolving, sum the steered, convolved, signals.

OBJECTS OF THE INVENTION

An object of the invention is to provide a beamformer which can receive and transmit signals in elevation as well as azimuth.

Another object of the invention is to provide a beamformer wherein the positions of all the elements are symmetrically located about the central axis.

Yet another object of the invention is to provide a beamformer which will function adequately even if not all the elements are present in each position.

A further object of the invention is to provide a beamformer wherein all the positions of the elements of each ring are located in N planes which have the central axis as one edge.

These and other objects of the invention will become more readily apparent from the ensuing specification when taken together with the drawings.

BRIEF DESCRIPTION OF THE DRAWINGS

FIG. 1 is a sketch showing the propagation geometry for an arbitrary array.

FIG. 2 is a sketch showing a general array having rotational symmetry.

FIG. 3 depicts a drawing, partially schematic and partially diagrammatic, showing the frequency domain beamformer for arrays with rotational symmetry.

DESCRIPTION OF THE PREFERRED EMBODIMENT

Before describing the preferred embodiments, a considerable amount of theoretical background information must be discussed.

The propagation geometry for an arbitrary array 10 is shown in FIG. 1, where the signal source is located at S and the nth receiving hydrophone is located at $R_n$. It is assumed that the wavefronts are either spherical or planar, so that the propagation delay from S to $R_n$ is $d_n/c$, where c is the speed of sound and $d_n$ is $\|S-R_n\|$, the distance from S to $R_n$.

Let the source S radiate a signal s(t), and let the received waveform at the nth hydrophone be $s_n(t)$. Then if only the propagation delays are considered, the received waveforms are given by Eq. (1).

$$s_n(t)=s[t-(d_n/c)] \tag{1}$$

Digressing momentarily, what is being done in the beamforming operation is adding appropriate delay to the delay produced by the propagation geometry, so that in a given look direction there is the same equivalent delay to all elements. For a given frequency component, a delay in the time domain is equivalent to a phase shift in the frequency domain. Now, suppose that this set of elements 34 are applied whatever phase shifts needed to form a beam in some look direction. Imagine leaving the elements alone, just rotating the set of phase shifts. What does that accomplish? It still forms a beam but in a rotated look direction.

So, from that it may be seen that circular convolutions can be used to form beams in successive directions, because multiplication by the set of phase shifts is being done. So that a part of the mathematics is in deriving what those appropriate phase shifts have to be.

That is done by first looking at the delay. Eq. (1) is the delay to the nth element from a source S whose distance from the nth element is $d_n$, that is, assuming plane wave or spherical wave propagation. Also, it is assumed that the source S is far enough away that there is essentially the same attenuation of each element in the array, so it is useful for the Fresnel zone or the far field but it is not a near field beamforming.

Define the Fourier transforms of $s_n$ and s by Eqs. (2) and (3).

$$s_n(f)=\int e^{-i2\pi ft}s_n(t)dt \tag{2}$$

$$S(f)=\int e^{-i2\pi ft}s(t)dt \tag{3}$$

The time-domain beamformer output desired is given by Eq. (4) and its frequency-domain equivalent by Eq. (5).

$$b(t) = \sum_n s_n(t + \|R - R_n\|/c) \tag{4}$$

$$B(f) = \sum_n S_n(f)\, e^{i2\pi f\|R - R_n\|/c} \tag{5}$$

The term $\|R-R_n\|$ is the square root of the inner product of $R-R_n$ with itself, to get the term in parentheses on the right hand side of Eq. (6). The square root is the norm. Then the only approximation made is shown immediately after Eq. (7), the square root of one plus a small quantity is approximately equal to one plus half the quantity, that is applied to Eq. 7.

With that approximation, Eq. 9 is obtained, showing three contributions to the distance $d_n$, or equivalently to the delay. The first term is the same for all elements in all look directions, so it may be ignored, it just produces a constant delay by the propagation from the source to origin in the array.

The term $\|S-R_n\|$ will now be approximated, assuming $\|S\| >> \|R_n\|$, i.e. the source is not in the near field of the array.

$$d_n= \|S-R_n\| =([S,S]-2[S,R_n]+[R_n,R_n])^{\frac{1}{2}} \tag{6}$$

$$d_n= \|S\|(1-2[S,R_n]/[S,S]+[R_n,R_n]/[S,S])^{\frac{1}{2}} \tag{7}$$

If $|x|<<1$, $$(1+x)^{\frac{1}{2}}\approx 1+0.5\times d_n\approx \|S\|(1-[S,R_n]/\|S\|^2+\text{-}\|^2/2\|S\|^2) \tag{8}$$

$$d_n\approx \|S\| -[S,R_n]/\| + \|R_n\|^2/2\|S\| \tag{9}$$

Apart from a linear phase term corresponding to a pure delay, the frequency-domain beamformer output is approximately given by Eq. (10), where $U=S/\|S\|$ is a unit vector in the desired look direction.

$$B(f) = \sum_n S_n(f)\, e^{-i2\pi[U,R_n](f/c)} \tag{10}$$

Steering Phase Shift $$e^{i2\pi(f/c)(\|R_n\|^2/2\|S\|}$$

Focusing Phase Shift

Since the focusing term is independent of the desired look direction, the computational overhead for focusing to a given range is negligible, requiring only a point-by-point multiplication of each of the element outputs at each frequency.

The focusing term in Eq. (10) will generally be included when the Fresnel region is being examined and omitted for the far field. Eq. (10) can also be written using wavelength as a parameter, as shown in Eq. (11).

$$B(f) = \sum_n S_n(f)e^{ei2\pi[U,R_n]/\lambda} \tag{11}$$

$$e^{i2\pi\|R_n\|^2/(\lambda\|R\|)}$$

From Eq. (11) it is evident that the far field approximation is valid if $\|S\| >> D^2/\lambda$, where D is the diameter of the array, as shown in FIG. 2.

Equation 11 takes into account the approximation made in the equation between Eqs. (7) and (8). It is an approximation, but it is very good approximation for every normal beamforming case.

Now usually a second approximation can be made and that is to ignore the focusing. It is only for a very large array at very long wavelengths that one has to consider the focusing, because normally the signal will be far enough away that focusing is not necessary, particularly in the critical cases for signal detection.

Circular ring arrays will now be discussed. See FIG. 2. The circular ring array will be used as a subarray of the general circularly symmetric array. In rectangular coordinates, let the nth element be located at $(x_n,y_n,z_n)$. The conversion to polar coordinates for the points on the ring is given by Eqs. (12)-(14), where E is the elevation angle of a point on the ring, $A_n$ is the azimuth angle of the nth point on the ring, and r cos E is the radius of the ring, where r is the distance from the origin to a point on the ring.

$$x_n=r\cos E\cos A_n \tag{12}$$

$$y_n=r\cos E\sin A_n \tag{13}$$

$$z_n=r\sin E \tag{14}$$

If the kth desired look direction has elevation angle F and azimuth angle $G_k$, then the corresponding unit vector and inner product with the nth element position vector are given in Eqs. (16) and (17).

$$U_k=(\cos F\cos G_k, \cos F\sin G_k, \sin F) \tag{16}$$

$$[U_k,R_n]=r\cos E\cos F(\cos A_n\cos G_k+\sin A_n\sin G_k)+r\sin E\sin F=r\cos E\cos F\cos(A_n-G_k)+r\sin E\sin F \tag{17}$$

Eqs. (11) and (17) may be combined to give the computation of focussed beams for a circular ring array shown in Eq. (18). If the elements and the steering directions are uniformly spaced in azimuth at $A_n = 2\pi n/N$ and $G_k = 2\pi k/N$, then the beamformer is simplified as shown in Eqs. (19), with a circular convolution or correlation as the principal computation.

$$B_k(f) = \sum_n S_n(f)\, e^{i(2\pi/\lambda)\{(r2/\|R\|) - r \cos E \cos F \cos(A_n - G_k) + r \sin E \sin F\}} \quad (18)$$

$$B_k(f) = e^{i(2\pi/\lambda)(r2/\|R\|) - r \sin E \sin F)} \sum_n S_n(f)\, e^{-i(2\pi r/\lambda) \cos E \cos F \cos 2\pi(n-k)/N} \quad (19)$$

The circular convolutions may be performed at high speed through FFTs or number theoretic transforms such as the Fermat or Mersenne transforms. This is discussed by Agarwal, R. C. and C. S. Burrus, *Fast One-Dimensional Digital Convolution by Multidimensional Techniques*, IEEE Trans. on Acoustics Speech, and Signal Processing, February 1974, pp. 1-10.

General rotationally symmetric arrays will now be discussed. As may be seen in FIG. 2, these arrays can be viewed as a set 20 of M coaxial circular ring arrays, 22-1 through 22-M, stacked vertically.

Let the mth ring 22-m have radius $q_m$, elevation angle $E_m$, and distance from the origin of $r_m$. Then $q_m = r_m \cos E_m$, and the extension of circular array beamforming Eq. (19) is given by Eq. (20) or Eq. (21):

$$B_k(f) = \sum_m e^{i(2\pi/\lambda)\{(r_m2/\|R\|) - r_m \sin E \sin F\}} \sum_n S_{mn}(f) e^{-i(2\pi/\lambda) q_m \cos F \cos 2\pi(n-k)/N} \quad (20)$$

$$B_k(f) = e^{i(2\pi/\lambda)\{(q_m2/(\|R\| \cos 2E_m)) - q_m \tan E_m \sin F\}} \sum_n S_{mn}(f) e^{-i(2\pi/\lambda) q_n \cos F \cos 2\pi(n-k)/N} \quad (21)$$

If focusing is not required, the slightly simplified beamformer of Eq. (22) may be used instead:

$$B_k(f) = \sum_m e^{-i(2\pi/\lambda) q_m \tan E_m \sin F} \sum_n S_{mn}(f) e^{-i(2\pi/\lambda) q_m \cos F \cos 2\pi(n-k)/N} \quad (22)$$

The reconstruction of the time domain output is relatively simple for this beamformer 30 because of the fact that the beam directions do not depend upon the temporal frequencies, that is the beam directions are angles $(2\pi K/N)$, no matter what the frequency is. So that means that all one has to do is to collect together the different frequency components in a given angle and then take an inverse Fourier transform.

This is different from prior art frequency domain beamformers. For example, a very common frequency domain beamformer is the line array beamformer using a double FFT, one in time and one in space. Using this system then, beam directions are different at different frequencies, which means there is great difficulty trying to get back into the time domain with the formed beam. What has to be done is take the different beams formed in the frequency domain and do interpolations. Accurate interpolation requires either complicated computations or a very high sampling rate. This latter greatly increases the system's memory requirements. Here there is no need for interpolations, which is one of the very strong points of this invention. This relates to the single circular array with arbitrary elevation angles.

And then, for the general array, the outputs for a number M of such individual circular arrays are summed. It just requires an additional summation over M, things just like the previous equation. So the final beamformer equation is Eq. 22.

Notation $A_n$ azimuth of nth element in circular ring
$b_{(t)}$ beamformer output in the time domain
B(f) beamformer output in frequency domain
$B_k(f)$ frequency domain output of beamformer for kth azimuth
c speed of sound in water
D array diameter
E elevation angle of ring
$E_m$ elevation angle of mth ring
f frequency
F elevation angle of look direction
$G_k$ azimuth of kth look direction
k index for look direction
m index for ring
n index for element in array or subarray
$q_m$ radius of mth ring
r distance from origin to point on ring
$r_m$ distance from origin to point on mth ring
S vector from origin to assumed source location
$R_n$ vector from origin to nth element position
s(t) radiated signal
$s_n(t)$ signal received at nth hydrophone
S(f) Fourier transform of radiated signal
$S_n(f)$ Fourier transform of signal received at nth hydrophone
U unit vector in the assumed source direction, i.e., steering direction
$U_k$ unit vector in the kth steering direction
λ wavelength of propagation signal Referring now to FIG. 3, therein is shown a frequency domain beamformer 30 for arrays with rotational symmetry. The beamformer comprises a plurality of M arrays, 32-1 through 32-M, in the form of M rings, which may be of different diameters, disposed one above the other.

As may be seen more clearly in FIG. 2, all rings, designated therein as 22-1 through 22-M, have their central axes along the same straight line 24.

Referring back to FIG. 3, each ring 32 has a maximum of N signal receiving elements 34, $3 \leq N \leq 300$. The elements 34 are symmetrically disposed about the ring 32, whether all N elements in any specific ring are present or not. The position of each element or missing element is symmetrically disposed about the axis 24.

The elements 34 may be hydrophones in an acoustic system, for example in sonar, or they may be used in antenna arrays. When used in antenna arrays, the only limitation which must be considered is the bandwidth of the system. The invention is very applicable to low frequencies, such as for communication underwater. For use at higher frequencies the charge-coupled device shift rate may not be fast enough to sample an analog signal at a fast enough rate. The sampling requirements may be eased from the usual sampling at the Nyquist rate by replacing the low pass filters 36F with bandpass filters. The frequency would then be translated down to base band. This is a fairly common way of reducing the sampling rate requirements.

If this technique be used, then the invention may be useful at much higher center frequencies. This is so because a limitation to the invention is the bandwidth of the signal and not the highest frequency used. For example, there may be a 100-kHz bandwidth at frequencies of tens, hundreds, or thousandths of Mhz.

It will be noted that in the present invention the array 32 need not be entirely filled with elements 34. That is, although the beamformer 30 provides for elements 34 located at azimuth angles of $2\pi n/N$, for $n=0, 1, \ldots, N-1$, and corresponding steering directions, one might leave out every other array element to provide twice as many look directions as elements around each circle. Similarly, only each third element may be provided if it is desired to have three times as many look directions in azimuth as element locations in azimuth, etc.

Suppose the array was a four-element array, and it was desired to look at eight directions. Eight uniformly spaced increments and angles would be picked, but then elements would be placed at only four of those locations, leaving nothing at the other points. The beamforming would be done as though all eight points were present.

The illustration of FIG. 2 shows 4 elements in each ring 22.

Referring back to FIG. 3, if it was desired to look in eight different directions, there would be eight entries into the demultiplexer 42, with just zeroes going into the other four points. Additional DFT's 38 or additional lowpass filters 36F or sample-hold elements 36SH, would not be needed, for there would just be zeroes conveyed anyway, but the 8 points in the demultiplexer 42 would be needed and the circular convolutions performed by convolvers 44 would then be of size 8. The number of look directions can be made any desired multiple of the number of points in the actual array.

The reason one might want to do this, is when one goes to form the beams, and looks at the sensitivity at one beam to targets in different directions, some kind of lobe structure is evident. If the next look direction is different, then the next beam formed may have a pattern which overlaps the first beam pattern. That means that if a target were actually situated in between, there would be some crossover, and there would be reduced sensitivity, a loss of sensitivity, in the direction of the target. It might be desired to actually have the beams more closely spaced than the width of the beams. So that is a reason why one might want to form more beams than elements, and that is fairly easy to do in this invention.

When the identities are examined, it can be seen that basically most of the work in the computation is a circular convolution. The Fourier transforms are taken, and they are being multiplied by the function of $n-K$, resulting in a circular convolution. This is exemplified by Eq. 19. The exponential on the outside is a multiplication which is independent of n and K, which only depends upon the elevation angles, so that there is not much extra computation. So almost all of the work entails circular convolution, which is something that can be done at high speed. Several different ways in which it can be done are discussed hereinbelow.

Circular convolutions through an FFT can be done if the number of elements corresponds to an FFT length, a highly composite number, such as but not necessarily a power of two. There what one would do is take the two things it is desired to convolve, take their FFTs, multiply them together and perform an inverse FFT. That is a standard procedure for high-speed convolution.

In addition to the FFT there are some more recently discovered transforms which can be computed at higher speed, called number-theoretic transforms, including the Fermat, the Mersenne, transforms.

Another recently discovered algorithm useful for this invention is the Winograd Fourier transform algorithm (WFTA), first published by Dr. Winograd in July 1975. Two useful articles describing this algorithm are: "On Computing the Discrete Fouriier Transform," by Shmuel Winograd, published in the Proceedings National Academy Science, U.S.A., Vol. 73, No. 4, pp. 1005/1006, April 1976; and (2) "An Introduction to Programming the Winograd Fourier Transform Algorithm (WFTA)," by Harvey F. Silverman, which appeared in the IEEE TRANSACTIONS ON ACOUSTICS, SPEECH, AND SIGNAL PROCESSING, VOL. ASSP/25, NO. 2, April 1977.

The Winograd algorithm is related to but not identical to the FFT algorithm. It is adaptable for computer calculation as is the fast Fourier transform algorithm, but it requires much fewer multiplications.

A plurality of M sets of means for filtering 36F, an input of each means being connected to an output of an element 34, permits the filtering through of the low frequencies of the signals received by the elements. A plurality of M sets of means for sampling and holding 36SH has its input connected to an output of a means for filtering 36F.

The means for sampling and holding 36SH is a conventional circuit. It accepts a continuous signal from an element 32, samples the input signal at uniformly spaced discrete time intervals.

This assumes a digital implementation of a discrete Fourier transform were required, usually as a part of an A/D converter.

If, on the other hand, a chirp-Z transform implementation were used, with charge-coupled devices, the input of each of such devices will, in fact, act as its own sample-and-hold circuit.

It will be noted that reference numeral 36 relates to the combination of 36F and 36SH.

A plurality of M sets of transform means 38, an input of each means being connected to an output of a sample and hold means 36, takes a temporal discrete Fourier transform (DFT) of its input signal. The Fourier transforms can of course be computed via fast Fourier transforms (FFTs) or chirp-Z transforms, both of which have been extensively described and utilized in the prior art.

A plurality of M means for demultiplexing, each means having a set of inputs connected to the outputs of a set of DFT means, convert their parallel input signals into serial output signals.

A plurality M of convolving means 44, each having an input connected to the serial output of the means for demultiplexing 42, circularly convolves the demultiplexed signals.

The circular convolutions may be performed in several different ways: (1) In analog form using transversal filters such as charge-coupled devices (CCD) or surface acoustic wave (SAW) transversal filters; (2) in analog form using CCD or SAW cross-convolvers; (3) in digital form using digital cross-convolvers or cross-correlators; or, (4) in digital form using the FFT or the newer number-theoretic transforms such as the Fermat transform or the Mersenne transform. In each of these cases the circular convolution of a and b is the inverse transform of the product of the transform of a with the transform of b.

It will be noted that at each frequency the beams are formed in azimuth angles of $2\pi k/N$, for $k=0, 1, \ldots, N-1$, independent of the frequency. This means that the beams may be reconstructed in the time domain by simply taking an inverse Fourier transform across frequencies for each beam direction. This is in contrast to the "Ω-K" or two-dimensional Fourier transform beamformer for the line array using a discrete Fourier transform, since in that case the steering directions are different for each temporal frequency, and a difficult interpolation is required for reconstruction of the beams in the time domain.

Referring back to FIG. 3, means 46 having an input to each of the means for circularly convolving, steer the convolved signals. Means 48, whose inputs are connected to the means for convolving 44, sum the steered, convolved, signals.

In U.S. Pat. No. 4,050,850, referenced hereinabove, in FIGS. 1 and 3 is shown a reference function generator 20 which may be adapted for use as the function generator, 46 or 52, of this invention.

The beamformer may further comprise optional focusing means 50. Means 52 are provided for generating the functions required for focusing the beamformer. A plurality M of multiplying means 54, each having an input from the demultiplex means 42 and the function generating means 54, has its output connected to the means for circularly convolving 44.

Some of the key advantages and new features of the beamformer of this invention are as follows: (1) It provides for three-dimensional arrays with rotational symmetry; (2) It is faster than existing beamformers for such arrays; (3) It provides for many more beam directions in azimuth than element locations in azimuth if desired; (4) It provides for simple reconstruction of the time-domain beam outputs if desired, for cross-correlation, etc.; and (5) The beamformer can be implemented using modular architecture; that is, it can be implemented entirely with DFT devices, using point-by-point multiplication, using multiple DFT subsystems for high speed, for a single DFT subsystem used repeatedly, for minumum cost, weight and power.

Obviously, many modifications and variations of the present invention are possible in the light of the above teachings, and, it is therefore understood that within the scope of the disclosed inventive concept, the invention may be practiced otherwise than as specifically described.

What is claimed is:

1. A frequency domain beamformer comprising:

a plurality of M arrays in the form of M rings, which may be of different diameters, disposed one above the other, all rings having their central axes along the same straight line, each ring having a maximum of N signal receiving elements, $3<N<300$, symmetrically disposed about the ring whether all N elements in any specific ring are present or not, the position of each element or missing element, being symmetrically disposed about the axis;

a plurality of M sets of means for filtering, an input of each means being connected to an output of an element, for permitting the filtering through of the low frequencies of the received signals;

a plurality of M sets of means for sampling-and-holding, an input of each means being connected to an output of a means for filtering;

a plurality of M sets of transform means, an input of each means being connected to an output of a sample-and-hold means, for taking a temporal discrete Fourier transform (DFT) of its input signal;

a plurality of M means for demultiplexing, each means having a set of inputs connected to the outputs of a set of DFT means, for converting their parallel input signals into serial output signals;

a plurality M of convolving means, each having an input connected to the output of a means for demultiplexing, for circularly convolving the demultiplexed signals;

means, having an input to each of the means for circularly convolving, for steering the convolved signals; and means, whose inputs are connected to the means for convolving, for summing the steered, convolved, signals.

2. The beamformer according to claim 1, further comprising:

means for generating the functions required for focusing the beamformer; and a plurality M of multiplying means, each having an input from the demultiplexing means and the function generating means, whose output is connected to the means for circularly convolving.

3. The beamforming according to claim 1, wherein: the transform means cmprises FFT devices.

4. The beamformer according to claim 1, wherein the transform means comprises chirp-Z transform devices.

5. The beamformer according to claim 1, wherein: the means for circularly convolving comprise transversal filters.

6. The beamformer according to claim 5, wherein: the transversal filters comprise charge-coupled devices.

7. The beamformer according to claim 5 wherein the transversal filters comprise SAW devices.

8. The beamformer according to claim 1, wherein: the means for circularly convolving are cross-correlators.

9. The beamformer according to claim 1, wherein: the means for circularly convolving are cross-convolvers.

10. The beamformer according to claim 9, wherein: the cross-convolvers are CCD devices.

11. The beamformer according to claim 9, wherein: the cross-convolvers are SAW devices.

12. The beamformer according to claim 1, wherein: the means for circularly convolving are FFT devices.

13. The beamformer according to claim 12, wherein: the means for circularly convolving are Fermat transform devices.

14. The beamformer according to claim 12, wherein: the means for circularly convolving are Mersenne transform devices.

15. The beamformer according to claim 2, wherein: the transform means comprises FFT devices.

16. The beamformer according to claim 2, wherein: the transform means comprises Winograd transform devices.

17. The beamformer according to claim 2, wherein: the transform means comprises chirp-Z transform devices.

18. The beamformer according to claim 2, wherein:

the means for circularly convolving comprise transversal filters.

19. The beamformer according to claim 17, wherein: the transversal filters comprise charge-coupled devices.

20. The beamformer according to claim 17 wherein the transversal filters comprise SAW devices.

21. The beamformer according to claim 2, wherein: the means for circularly convolving are cross-correlators.

22. The beamformer according to claim 2, wherein: the means for circularly convolving are cross-convolvers.

23. The beamformer according to claim 21, wherein: the cross-convolvers are CCD devices.

24. The beamformer according to claim 21, wherein: the cross-convolvers are SAW devices.

25. The beamformer according to claim 2, wherein: the means for circularly convolving are FFT devices.

26. The beamformer according to claim 24, wherein: the means for circularly convolving are Fermat transform devices.

27. The beamformer according to claim 24, wherein: the means for circularly convolving are Mersenne transform devices.

28. The beamformer according to claim 2, wherein: the transform means comprises Winograd transform devices.

* * * * *